United States Patent [19]

Wills

[11] Patent Number: 4,651,079
[45] Date of Patent: Mar. 17, 1987

[54] PULSE WIDTH MODULATED INVERTER SYSTEM FOR DRIVING SINGLE PHASE A-C INDUCTION MOTOR AT A CONSTANT VOLTAGE/FREQUENCY RATIO

[76] Inventor: Frank E. Wills, 3355 Kingston Rd., York, Pa. 17402

[21] Appl. No.: 803,027

[22] Filed: Nov. 29, 1985

[51] Int. Cl.[4] .............................................. H02P 5/40
[52] U.S. Cl. .................................... 318/811; 318/749; 318/800; 318/812
[58] Field of Search ............... 318/811, 812, 800, 801, 318/768, 749

[56] References Cited

U.S. PATENT DOCUMENTS

| | | | |
|---|---|---|---|
| 3,343,063 | 9/1967 | Keeney et al. | 321/5 |
| 3,527,990 | 9/1970 | Gasser | 318/6 |
| 3,560,834 | 2/1971 | Studtmann | 321/4 |
| 3,760,248 | 9/1973 | Nola et al. | 318/811 |
| 4,080,554 | 3/1978 | Nordby | 318/227 |
| 4,320,331 | 3/1982 | Plunkett | 318/812 |
| 4,333,042 | 6/1982 | Kawada et al. | 318/811 |
| 4,408,268 | 10/1983 | Peters et al. | 318/811 |
| 4,491,778 | 1/1985 | Knox et al. | 318/811 |

Primary Examiner—David Smith, Jr.

[57] ABSTRACT

A sinusoidally weighted pulse width modulated switching signal may be developed, for operating an inverter to apply sinusoidal voltage to a single phase a-c induction motor, by comparing a triangular voltage waveform of fixed frequency with a variable frequency sine wave voltage, the switching signal varying between its high and low states whenever the triangular waveform and modulating sine wave intercept one another. A constant ratio of the amplitude of the sinusoidal motor voltage relative to the voltage's frequency, and thus motor speed, may be obtained simply by translating the sinusoidal modulating waveform through a high pass filter before it is compared with the triangular wave. By setting the filter cut-off frequency above the operating frequency range (preferably from about 12 to 60 hertz) of the sine wave generator, the sine wave voltage will be attenuated by the filter in an amount inversely proportional to the sine wave frequency. In this way, the amplitude of the sine wave will vary in step with, and directly proportional to, frequency changes to achieve a constant motor voltage/frequency ratio.

6 Claims, 2 Drawing Figures

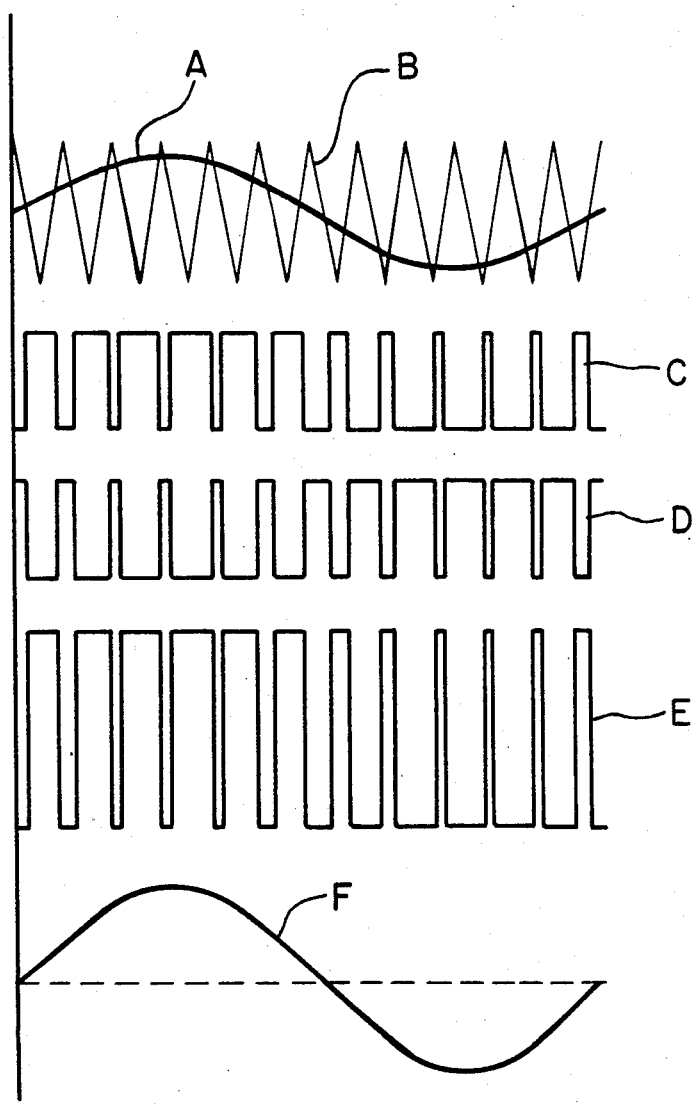

PULSE WIDTH MODULATED INVERTER SYSTEM FOR DRIVING SINGLE PHASE A-C INDUCTION MOTOR AT A CONSTANT VOLTAGE/FREQUENCY RATIO

BACKGROUND OF THE INVENTION

This invention relates to a simplified, highly efficient, pulse width modulated inverter system for supplying single phase, adjustable amplitude and frequency sinusoidal voltage to a single phase a-c induction motor at a constant amplitude/frequency ratio.

When an inverter is used to drive a motor at a variable speed, some arrangement is usually employed to vary the voltage applied to the motor in direct proportion to frequency, or speed, changes so that the ratio of the motor voltage to frequency will always remain the same. A fixed or constant amplitude/frequency ratio is desirable for a variety of reasons, such as to avoid overheating of the motor and to provide the motor with a constant torque output capability regardless of motor speed. When the inverter system is of the pulse width modulated type, complex circuitry is generally needed to maintain a constant ratio of voltage to frequency.

In contrast, the present invention provides a relatively simple, inexpensive, and efficient circuit arrangement for obtaining the desired constant amplitude/frequency ratio for the motor voltage in a pulse width modulated inverter system. The invention is particularly attractive when incorporated in such an inverter system for driving a single phase a-c induction motor.

SUMMARY OF THE INVENTION

The pulse width modulated inverter system of the invention supplies single phase, adjustable amplitude and frequency sinusoidal voltage to a single phase a-c induction motor at a constant amplitude/frequency ratio. The system comprises a triangular wave generator for developing a triangular voltage waveform of fixed frequency, and a sine wave generator for developing a sinusoidal voltage waveform of variable frequency. A differential comparator produces, in response to the triangular voltage waveform and the sinusoidal voltage waveform, a sinusoidally weighted pulse width modulated switching signal. There are means responsive to the switching signal for applying to the single phase motor a sinusoidal voltage having an amplitude and frequency determined by the amplitude and frequency of the sine wave voltage received by the comparator. Finally, the inverter sytem comprises a high pass filter effectively interposed between the sine wave generator and the comparator for adjusting the amplitude of the sine wave voltage applied to the comparator in response, and in direct proportion, to frequency variations of the sine wave, thereby to maintain a constant ratio between the amplitude and the frequency of the sinusoidal voltage applied to the motor.

DESCRIPTION OF THE DRAWINGS

The features of the invention which are believed to be novel are set forth with particularity in the appended claims. The invention may best be understood, however, by reference to the following description in conjunction with the accompanying drawings in which:

FIG. 2 depicts various voltage waveforms that appear in the inverter-motor system and will be helpful in understanding the operation of the invention.

DESCRIPTION OF THE ILLUSTRATED EMBODIMENT

Figure 1:
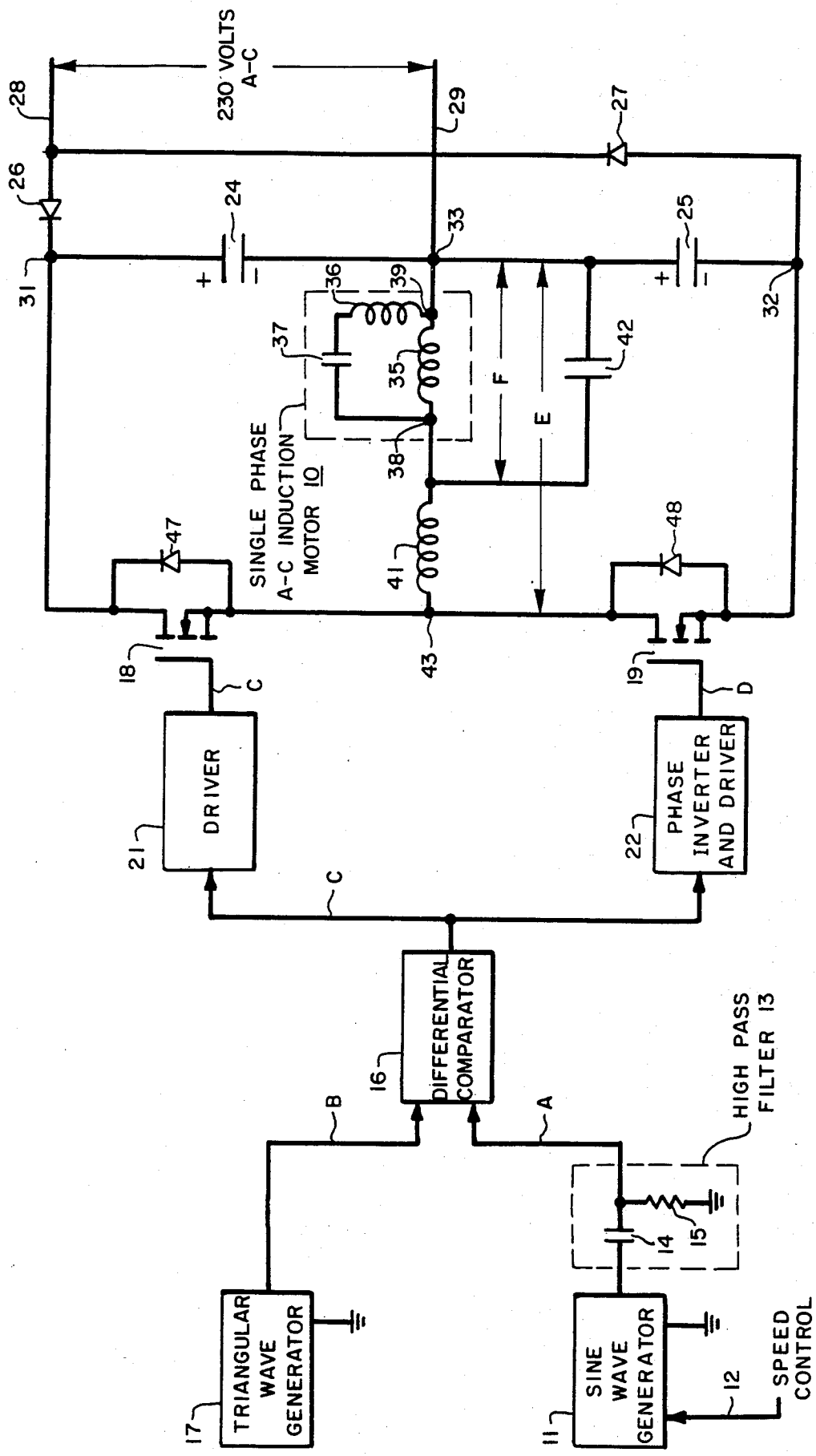
FIG. 1 schematically illustrates a pulse width modulated inverter system, constructed in accordance with the invention, and the manner in which that inverter system is coupled to a single phase a-c induction motor to apply thereto single phase, adjustable amplitude and frequency sinusoidal voltage at a constant amplitude/frequency ratio.

Referring to FIG. 1, variable frequency and amplitude, single phase a-c power will be supplied to single phase a-c induction motor 10 and the frequency of that power will be determined by the output of sine wave generator or oscillator 11. The generator has a "speed control" input 12 over which a control signal may be delivered to adjust the generator's frequency, thereby to control the speed of motor 10. The control signal may be derived by sensing some parameter or characteristic of the system, in which the inverter-motor system is incorporated, in order to automatically control the motor speed in response to that sensed information. On the other hand, control of the frequency of the sinusoidal voltage waveform produced by generator 11 may be effected merely by means of an appropriate manually adjustable control, such as a potentiometer, in generator 11. Preferably, the motor will be operated over a frequency or speed range from about 12 to 60 hertz.

In order to achieve a constant ratio of the amplitude of the motor voltage relative to the voltage's frequency, in accordance with a salient feature of the invention the variable frequency sinusoidal voltage from generator 11 is passed through a high pass filter 13, comprising a series connected capacitor 14 and a shunt connected resistor 15, whose cut-off frequency lies above the upper limit of the 12 to 60 hertz operating frequecy range. Preferably, the frequency response curve has a slope of about 6 db per octave. With such an arrangement, the sine wave voltage from generator 11 will be attentuated by the high pass filter 13 in an amount inversely proportional to the frequency of the sine wave. In this way, the amplitude of the sine wave, at the output of the filter, will vary in step with, and directly proportional to, frequency changes in generator 11 and, as will be appreciated, this will achieve a constant motor voltage/frequency ratio. It should be noted, however, that the employment of high pass filter 13 to automatically adjust the amplitude of the sine wave as a function of frequency provides a very simple and inexpensive circuit for achieving that result.

The adjustable amplitude and frequency sinusoidal voltage produced at the output of filter 13, and applied to one input of differential comparator 16, is depicted by voltage waveform A in FIG. 2. The other input of comparator 16 receives the output voltage (waveform B) from triangular wave generator 17. For illustrative purposes, the frequency of the triangular wave B is only twelve times the frequency of the sine wave A, but in practice the triangular shaped signal would have a fixed frequency of at least 10 kilohertz for reasons to be explained. When the sine wave and the triangular wave intercept one another (namely are equal in amplitude), comparator 16 switches operating states between its high and low levels, as a result of which the comparator produces a sinusoidally weighted pulse width modulated switching signal (waveform C) having a switching frequency component equal to the fixed frequency of the triangular wave B and a sine wave modulation component equal to the adjustable frequency of sine wave A. The arrangement of circuits 11–17 is particularly attractive in that it may be implemented with inexpensive low voltage logic circuits.

By observing waveforms A, B and C it is apparent that during each of the twelve cycles of the triangular wave B, a single positive-going pulse appears in the switching signal of waveform C and the duty cycle of that single pulse (namely, the width or duration of the pulse relative to the period or duration of the complete cycle) is determined by the instantaneous amplitude of the sine wave of waveform A. Specifically, the area of each positive-going pulse in the switching signal represents the amplitude of the sine wave at that instant. During each successive cycle of the triangular wave, the duty cycles change slightly since the instantaneous amplitude of the sine wave is changing. If the RMS (root mean square) amplitude of the sine wave is then varied, the duty cycle of each positive-going pulse will also change. On the other hand, if the frequency of the sine wave changes, the duty cycles will also change. In addition, the rate at which the duty cycles change from one switching interval (namely from one cycle of the triangular wave) to the next will be varied.

The sinusoidally weighted pulse width modulated switching signal of waveform C is employed to turn a pair of solid state power switches 18 and 19 on and off in alternation (namely, one being on while the other is off and vice versa) to connect the motor 10 alternately across positive and negative high d-c voltage (compared to the low d-c voltage needed in the logic circuits) power supplies. More particularly, each of power switches 18 and 19 is preferably a field effect transistor, specifically a MOSFET, having source, drain and gate terminals. Since field effect transistors have high switching speeds they can be operated at high switching frequencies. The switching signal of waveform C is applied via driver 21 and in phase to the gate of power switch 18, whereas the switching signal is applied via phase inverter/driver 22 in phase opposition (180° out of phase), as shown by waveform D, to the gate of power switch 19. Each power switch is gated on in response to a positive-going pulse applied to its gate. Hence, whenever a positive-going pulse of waveform C turns switch 18 on, switch 19 will be off, and conversely whenever a positive-going pulse of waveform D renders switch 19 conductive, switch 18 will be non-conductive.

The positive and negative power supplies are provided by capacitors 24 and 25 and rectifier diodes 26 and 27. A-C power line voltage, such as 230 volts A-C, is received over line conductors 28 and 29 and is rectified by diodes 26 and 27 to charge capacitors 24 and 25 with the polarity indicated in the drawing. To elaborate, during each positive half cycle of the applied 230 volts A-C when the voltage on conductor 28 is positive relative to that on conductor 29, current flows through diode 26 to charge capacitor 24. During the alternate negative half cycles when the voltage on conductor 29 is positive with respect to the voltage on conductor 28, current flows to capacitor 25 and through diode 27. By appropriately matching the circuit elements, the d-c voltages across capacitors 24 and 25 will be equal in magnitude but opposite in polarity. Thus, capacitors 24 and 25 constitute a balanced d-c voltage source having a positive terminal 31, a negative terminal 32 and a neutral terminal 33 which is connected to conductor 29.

A positive power supply is provided between positive terminal 31 and neutral terminal 33, while a negative power supply exists between terminals 32 and 33.

Single phase a-c induction motor 10 is of conventional construction and is of the permanent split capacitance type having, in delta connection, a pair of field windings 35 and 36 and a phase shift capacitor 37. When a-c voltage is applied to the motor terminals 38 and 39, and thus across winding 35, the voltage will be phase shifted almost 90° by capacitor 37 for application to winding 36. This is necessary to effect motor rotation.

A low pass filter, comprising inductance coil 41 and capacitor 42, is effectively coupled in series with motor 10. Specifically, coil 41 is connected between motor terminal 38 and circuit junction 43 which connects to the source terminal of power switch 18 and to the drain terminal of power switch 19. Capacitor 42 is shunt connected across motor 10.

In operation of the inverter-motor system, each time power switch 18 is switched on, namely during each positive-going pulse of waveform C (at which time switch 19 will be off), the positive d-c voltage at terminal 31 will be applied to circuit junction 43 and thus across the series arrangement comprising filter 41, 42 and motor 10. On the other hand, each time power switch 19 is gated on by a positive-going pulse of waveform D, the negative d-c voltage at terminal 32 will be applied to terminal 43 and across the filter-motor circuit. As a result, voltage waveform E will appear between terminal 43 and neutral terminal 33 and thus across filter 41, 42 and motor 10. Since the switching frequency is so high (at least 10 kilohertz as mentioned), relatively inexpensive and small filter elements 41, 42 may be employed to remove from the signal of waveform E all signal components except the fundamental of the sine wave modulating frequency. The higher the ratio of the switching frequency to the sine wave modulating frequency, the higher will be the frequencies of the unwanted harmonics in waveform E and the easier may those harmonics be filtered out by low pass filter 41, 42. The greater the frequency separation between the modulating and switching frequencies, the simpler it is to eliminate the sidebands of the switching signal component. In other words, due to the wide separation of the wanted frequency component and the unwanted components, the inverter output (waveform E) can easily be filtered to give a pure sinusoidal output voltage waveform. Because of the high switching frequency used, all harmonics of any significance are of such a frequency that filtering can be accomplished with small and inexpensive circuit elements.

Moreover, since the switching frequency is so high relative to the modulating frequency, it is not necessary to correlate or synchronize the modulating and switching frequencies. Usually, the switching frequency is an integer multiple of the modulating frequency to avoid beat frequencies, and when the modulating frequency is changed, the switching frequency is also usually varied to maintain that desired relationship so that beat frequencies are not created. With the high switching frequency any beat frequencies are easily removed by filter 41, 42 so there is no need to have a switching frequency that is an integer multiple of the modulating frequency. As a consequence, the modulating frequency may be adjusted throughout its range (which is preferably from 12 to 60 hertz as mentioned) and the switching frequency, namely the frequency of the triangular wave produced by generator 17, may remain constant. This simplifies the construction of generator 17. In addition, such a fixed switching frequency allows the use of a resonant filter tuned to the switching frequency.

Since low pass filter 41, 42 removes all of the unwanted signal components in waveform E, only the perfect sinusoidal voltage shown by waveform F will be applied to the motor terminals 38 and 39 and thus will appear between terminal 38 and the neutral terminal 33. This sine wave voltage is, of course, identical to and is an exact simulation of the basic sine wave of waveform A. A highly efficient system is therefore provided. Genuinely sinusoidal, single phase voltage and current waveforms are produced in motor 10, while producing no motor performance degradation, namely minimum power losses, motor heating and motor noise.

Diodes 47 and 48, which shunt power switches 18 and 19, respectively, function to provide a path for the flow of reactive energy.

It is thus apparent that the invention provides a simplified pulse width modulated inverter system for operating a single phase a-c induction motor at a variable speed in a very efficient manner, while at the same time maintaining a constant ratio between the amplitude and the frequency of the sinusoidal voltage applied to the motor. The arrangement for developing the sinusoidally weighted pulse width modulated switching signal, which operates the inverter, is particularly unique in that merely by interposing a high pass filter 13 between the sine wave generator 11 and the differential comparator 16 the amplitude of the sine wave modulation component of the switching signal will automatically change in response to frequency changes of the sine wave to maintain a constant amplitude/frequency ratio of the motor voltage.

It should also be appreciated that the inverter system of the invention can easily be connected in an existing installation, with no modification of the single phase induction motor, to achieve variable speed operation. When a-c power line voltage is applied directly to a single phase induction motor to effect motor rotation at a constant speed, the inverter system can be effectively interposed between the source of power line voltage and the motor to facilitate adjustment of the motor speed.

While a particular embodiment of the invention has been shown and described, modifications may be made, and it is intended in the appended claims to cover all such modifications as may fall within the true spirit and scope of the invention.

I claim:

1. A pulse width modulated inverter system for supplying single phase, adjustable amplitude and frequency sinusoidal voltage to a single phase a-c induction motor at a constant amplitude/frequency ratio, comprising:

a triangular wave generator for developing a triangular voltage waveform of fixed frequency;

a sine wave generator for developing a sinusoidal voltage waveform of variable frequency;

a differential comparator coupled to said generators for producing, in response to the triangular voltage waveform and the sinusoidal voltage waveform, a sinusoidally weighted pulse width modulated switching signal;

means responsive to said switching signal for applying to the single phase motor a sinusoidal voltage having an amplitude and frequency determined by the amplitude and frequency of the sine wave voltage received by said comparator;

and a high pass filter effectively interposed between said sine wave generator and said comparator for adjusting the amplitude of the sine wave voltage applied to the comparator in response, and in direct proportion, to frequency variations of the sine wave, thereby to maintain a constant ratio between the amplitude and the frequency of the sinusoidal voltage applied to the motor.

2. A pulse width modulated inverter system according to claim 1 wherein said high pass filter includes a series connected capacitor and a shunt connected resistor.

3. A pulse width modulated inverter system according to claim 1 wherein the frequency of said sine wave generator is adjustable over a predetermined operating frequency range and wherein the cut-off frequency of said high pass filter lies above the upper limit of the range.

4. A pulse width modulated inverter system according to claim 1 wherein said sinusoidally weighted pulse width modulated switching signal turns a pair of solid state power switches on and off in alternation in order to connect the single phase motor alternately across positive and negative power supplies, a low pass filter being connected in series with the motor to filter out all of the signal components except the fundamental of the sine wave modulating frequency.

5. A pulse width modulated inverter system according to claim 1 wherein a speed control signal controls the frequency of the sine wave voltage produced by said sine wave generator, while said high pass filter controls the amplitude of that voltage as applied to said comparator, thereby to control the duty cycles of the pulses of said switching signal and the rate at which those duty cycles vary.

6. A pulse width modulated inverter system according to claim 1 wherein the fixed frequency of said triangular waveform provides said switching signal with a constant switching frequency which is very high relative to the sine wave modulating frequency, and wherein the output of said comparator switches between its high and low states whenever the triangular waveform and sine wave intercept one another.

* * * * *